(12) United States Patent
Dutertre

(10) Patent No.: US 10,201,224 B2
(45) Date of Patent: Feb. 12, 2019

(54) DEVICE FOR FIXING A FRAME IN A THROUGH-ORIFICE IN A PANEL

(71) Applicant: Steelcase Inc., Grand Rapids, MI (US)

(72) Inventor: Daniel Dutertre, Hindisheim (FR)

(73) Assignee: Steelcase Inc., Grand Rapids, MI (US)

( * ) Notice: Subject to any disclaimer, the term of this patent is extended or adjusted under 35 U.S.C. 154(b) by 126 days.

(21) Appl. No.: 15/127,704

(22) PCT Filed: Mar. 20, 2014

(86) PCT No.: PCT/FR2014/050650
§ 371 (c)(1),
(2) Date: Sep. 20, 2016

(87) PCT Pub. No.: WO2015/140418
PCT Pub. Date: Sep. 24, 2015

(65) Prior Publication Data
US 2017/0135467 A1    May 18, 2017

(51) Int. Cl.
*A47B 21/06* (2006.01)
*A47B 95/00* (2006.01)
(Continued)

(52) U.S. Cl.
CPC .............. *A47B 21/06* (2013.01); *A23K 10/12* (2016.05); *A23K 10/30* (2016.05); *A23K 10/37* (2016.05);
(Continued)

(58) Field of Classification Search
CPC .................. A47B 21/06; A47B 95/00; A47B 2200/0082; F16B 12/20; B21D 53/74;
(Continued)

(56) References Cited
U.S. PATENT DOCUMENTS 4,120,416 A * 10/1978 Suk .......................... H02G 3/123
220/3.4
D325,564 S * 4/1992 Lemke ......................... D13/154
(Continued)

FOREIGN PATENT DOCUMENTS

EP    2685577    1/2014

OTHER PUBLICATIONS

European Patent Office; International Search Report; dated Nov. 7, 2014.

*Primary Examiner* — Bayan Salone
(74) *Attorney, Agent, or Firm* — Price Heneveld LLP

(57) ABSTRACT

A device for fixing a frame in a through-hole extending between two opposite faces of a panel the frame including a peripheral wall having an upper and lower edges and configured to cover a structure of the panel delimiting the through-hole the upper edge including an edge configured to rest against a first face of the panel, wherein the device includes a clamping element including an arm integral with a perpendicular tab and an assembly structure configured to secure the tab on the second face of the panel in the vicinity of the through-hole, the arm configured to exert, a force on the peripheral wall adapted to flatten the peripheral wall against the structure of the panel defining the through-hole and to exert a force on a stop of the peripheral wall adapted to flatten the ledge of the frame against the first face of the panel when the tab is fixed on the second face of the panel.

18 Claims, 5 Drawing Sheets

(51) Int. Cl.
  *A23K 10/12* (2016.01)
  *A23K 10/30* (2016.01)
  *A23K 10/37* (2016.01)
  *A23K 50/10* (2016.01)
  *F16B 12/20* (2006.01)
  *B21D 53/74* (2006.01)
  *A23K 20/189* (2016.01)

(52) U.S. Cl.
  CPC ............ *A23K 20/189* (2016.05); *A23K 50/10* (2016.05); *A47B 95/00* (2013.01); *F16B 12/20* (2013.01); *A47B 2200/0082* (2013.01); *Y02P 60/877* (2015.11); *Y10T 29/49623* (2015.01); *Y10T 29/49625* (2015.01); *Y10T 29/49629* (2015.01)

(58) Field of Classification Search
  CPC ......... Y10T 29/49623; Y10T 29/49625; Y10T 29/49629; A23K 50/10; A23K 20/189; A23K 10/12; A23K 10/30; A23K 10/37
  USPC .............................. 29/897.3, 897.31, 897.32
  See application file for complete search history.

(56) References Cited

U.S. PATENT DOCUMENTS

| | | | | |
|---|---|---|---|---|
| 5,449,859 | A * | 9/1995 | Bordwell | H02G 3/185 174/486 |
| 5,575,668 | A * | 11/1996 | Timmerman | A47B 21/06 174/482 |
| 7,173,194 | B2 * | 2/2007 | Rupert | H02G 3/185 174/480 |
| 7,878,845 | B2 * | 2/2011 | Byrne | H02G 3/385 174/486 |
| 9,392,869 | B2 * | 7/2016 | Byrne | H02G 3/123 |
| 2004/0075373 | A1 | 4/2004 | Gershfeld | |
| 2006/0169471 | A1 * | 8/2006 | Rupert | H02G 3/185 174/50 |
| 2009/0301774 | A1 * | 12/2009 | Byrne | E04F 15/024 174/483 |
| 2011/0067896 | A1 * | 3/2011 | Baldwin | H02G 3/123 174/58 |
| 2015/0320204 | A1 * | 11/2015 | Byrne | H02G 3/123 361/807 |

* cited by examiner

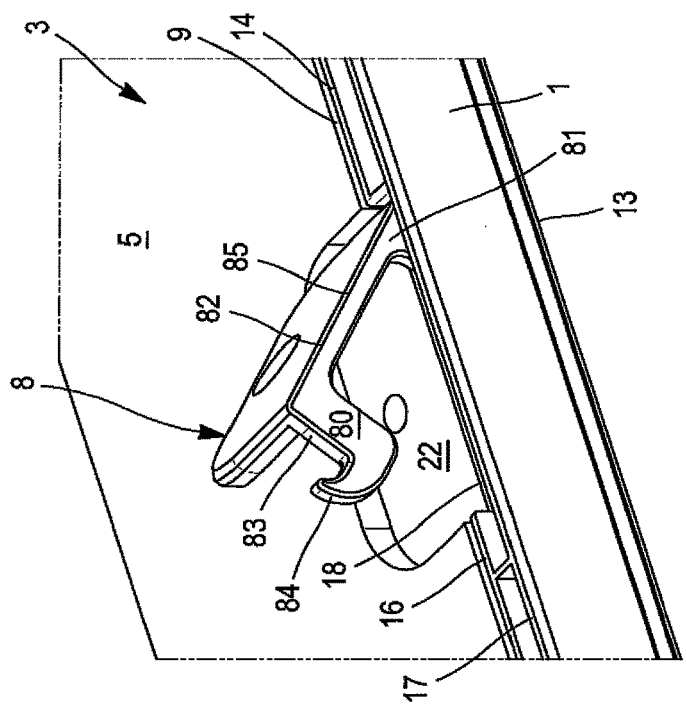
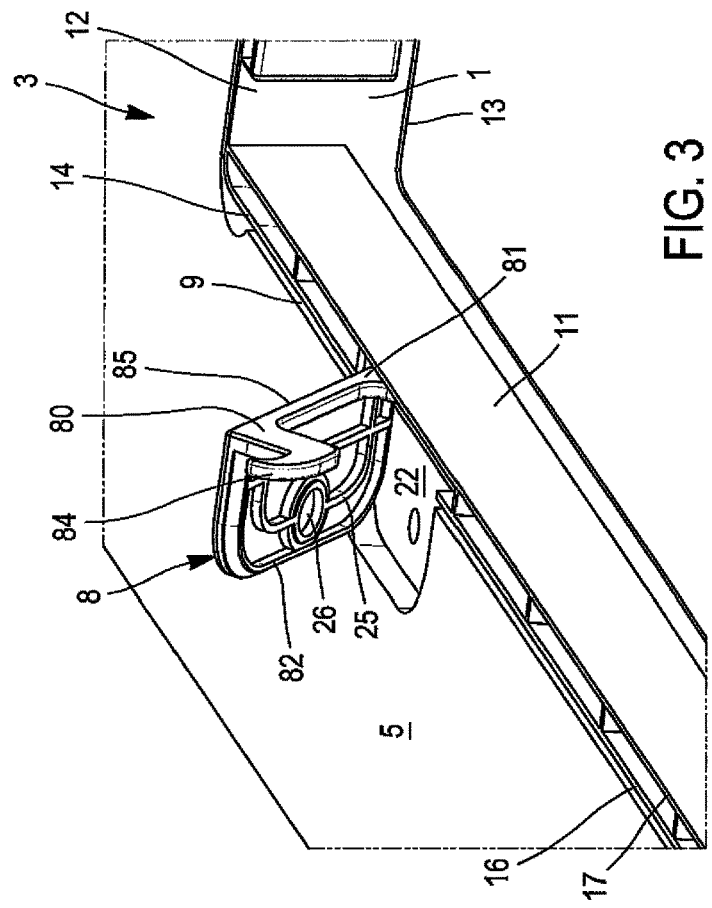

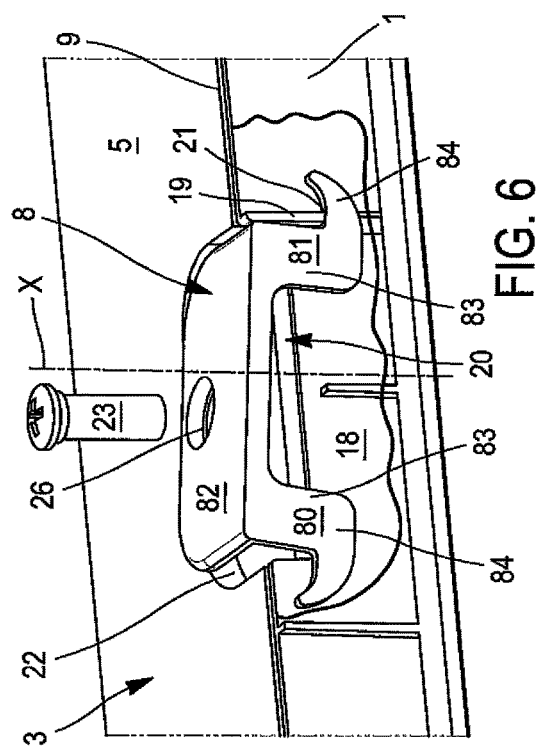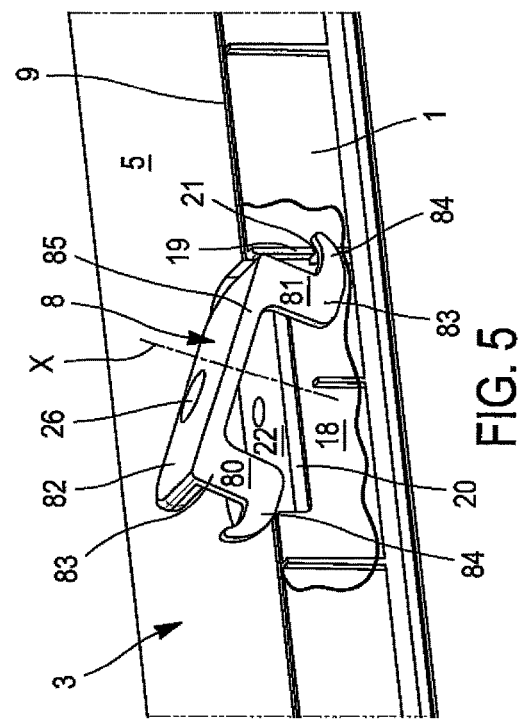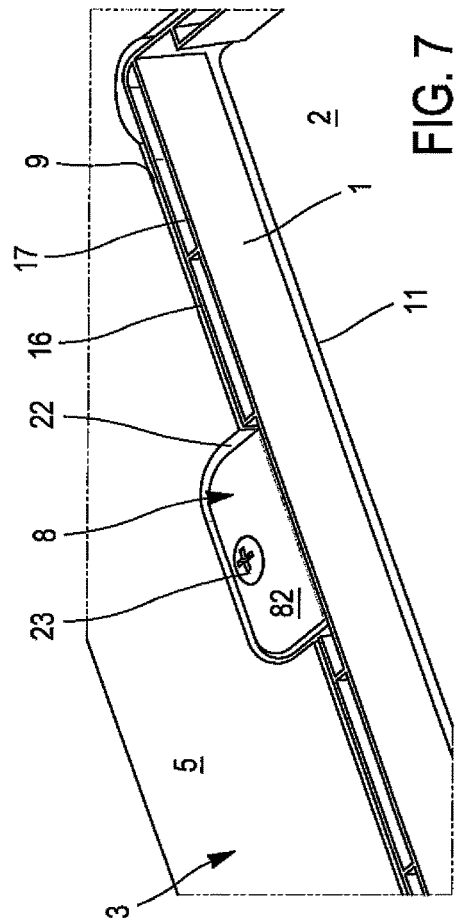

DEVICE FOR FIXING A FRAME IN A THROUGH-ORIFICE IN A PANEL

BACKGROUND OF THE INVENTION

The present invention concerns a device for fastening a frame in a through-hole extending between two opposite faces of a panel such as in particular a working plane, said frame consisting of a peripheral wall having an edge top and a bottom edge, said peripheral wall being capable of coating the panel structure delimiting said through-hole, and its upper edge being provided with an edge adapted to rest against a first face of the panel around said through-hole.

It is common to equip a panel, of the work area type, with an orifice for access from the top of the work area to the space located below its underside, so as to provide a passageway through which for example it is possible to connect the connecting cables of electrical appliances arranged on the work area to sockets or connectors underneath the work area.

Whether for functional purposes or simply for aesthetic purposes, such a through-hole is generally coated with a frame formed of a peripheral wall equipped with a flange resting on the upper face of the work plan, around the through-hole, and masking the panel structure around the through-hole. Optionally, such a framework can also be a support for a sealing means of at least part of the through-hole, such as for example a pivoting or sliding access door.

Conventionally, the frame can be simply mounted with a tight fit in said through-hole, without using any additional connecting element, its correct positioning is achieved when the flange bears against the top side of the workplan. Such a solution is for example known from document EP 2 251 949 A2. It is advantageous because of its structural simplicity and the fact that it does not require any particular dexterity on the part of a user, since it suffices to fit the frame in said through-hole until the flange is in support against the workplan. However, it is not fully satisfactory, especially when implemented in the case of a framework acting as support for a sealing means.

Indeed, in this case, such a framework is generally subjected to frequent handling that can quickly lead to its untimely disengagement from said through-hole, which requires an intervention to reposition properly. On the other hand, due to possible manufacturing defects, or due to the use of materials having a certain deformability, the fit between the through-hole and the frame is not always perfect, which can result in looseness between said frame and said through-hole, damaging both the quality of the socket as well as the aesthetic appearance of the assembly.

The objective of the present invention is therefore to provide a device for fixing a part in a through-hole extending between two opposite faces of a panel such, as in particular, a work plan, ensuring both the stability of the assembly between the frame and the through-hole, preventing any unexpected dislocation, and guaranteeing the perfect positioning of the frame in the through-hole for a flawless appearance.

SUMMARY OF THE INVENTION

To this end, the invention concerns a device for fixing a part in a through-hole extending between two opposite faces of a panel such as in particular a worktop of the kind indicated in the preamble, characterized in that it comprises at least a clamping element comprising at least one arm integral with a tab extending in a plane perpendicular to said arm, and an assembly means for securing said tab on the second face of the panel adjacent to the hole therethrough, said arm of the clamping element being arranged to exert on the one hand, on said peripheral wall, a force to flatten said peripheral wall against the panel structure defining said through-hole and on the other hand, on a stop comprised in said peripheral wall, a force to flatten the rim of said frame against the first face of the panel when said tab is fixed to the second face of the panel.

In accordance with an alternative embodiment of the invention, the peripheral wall of the frame is a dual wall having an outer wall and an inner wall, the outer wall having at least one cutout extending from the lower edge toward the upper edge of the peripheral wall, over a length substantially corresponding to the width of the tab of the clamping element and a height substantially corresponding to the thickness of the tab, said cutout and the space between the outer wall and the inner wall, to vicinity of said cutout, defining a housing for said arm of the clamping element.

Moreover, the arm of the clamping element preferably includes a substantially rectilinear portion extended by a hook-shaped portion.

In this case, said stop may advantageously be defined by a rib extending along a side end of said cutout between the outer wall and the inner wall of the peripheral wall from the lower edge toward the upper edge thereof, the length of said rib corresponding substantially to the length of the substantially straight portion of the arm of the clamping element.

Furthermore, thanks to an additional feature, the gap provided between said inner and outer walls is configured such as to allow a tight fit of the arm of the clamping element engaged in said housing.

The present invention is further characterized in that the double wall is reinforced by a series of ribs, preferably substantially equidistant, connecting together the outer wall and the inner wall and extending between the upper and lower edges of the peripheral wall.

According to a preferred embodiment of the invention, said clamping element comprises two arms extending in the same plane perpendicular to said tab, and symmetrical with respect to an axis centered on a side of said tab to which they are secured.

Another feature of the invention is further defined by the fact that the second face of the panel comprises in the vicinity of the through-hole a recess of complementary shape to said tab and wherein said tab can rest when said arm is engaged in said housing and supported on said abutment.

Preferably, the connecting means for securing the tab against the second face of the panel is selected from the list comprising a screw, a tail clip, a rivet, and in this case, said tab preferably comprises at least one hole allowing the passage of said assembly means.

In addition, the tab can advantageously comprise stiffening means such as, for example at least one ridge traversing its underside.

Another object of the invention relates to an implementation method of a device as described above, for fixing a part in a through-hole extending between two opposite sides of a panel, such as in particular a work plan in which:
  is inserted into said through-hole a frame consisting of a peripheral wall having an upper edge and a bottom edge, said peripheral wall being capable of coating the panel structure delimiting the said through-hole, and its upper edge being equipped with a flange adapted to rest against a first face of the panel around said through-hole, said peripheral wall further including a stop, the edge of the frame is placed against a first face of the panel around said through-hole, one places an arm integral with a tab of a clamping element in contact with the peripheral wall of the frame and the abutment that it comprises, said arm is pivoted about said abutment so as to bring the said tab of the clamping element in contact with the second face of the panel, said tab is fixed to said second face of the panel in such a way that said arm exerts on the one hand on said abutment a force to press the edge of said frame against the first face of the panel and on the other hand against said peripheral wall a strength for pressing said peripheral wall against the panel structure defining said opening.

According to a feature of the method according to the invention, to position the arms of the clamping element in contact with the peripheral wall of the frame and the abutment it includes, it is engaged in a housing formed between an outer wall and an inner wall of the peripheral wall of the frame.

In accordance with another characteristic of the process according to the invention, when the tongue of the clamping element is in contact with the second face of the panel, it is positioned in a complementarily shaped recess formed in said second face of said panel.

Moreover, to secure the tab of the clamping element on said second face of the panel, the method according to the invention expects preferably to use an assembly means selected from the list comprising a screw, a tail clip, and a rivet.

BRIEF DESCRIPTION OF THE DRAWINGS

The present invention and its advantages will become more apparent from the following description of an alternate embodiment given as a nonlimiting example, with reference to the appended drawings in which:

FIGS. 3 to 7 are views of detail D of FIG. 2, showing various stages of implementation of the device according to the invention, the frame being shown in partial section in FIGS. 5 and 6.

DETAILED DESCRIPTION OF THE PREFERRED EMBODIMENTS

Figure 1A:
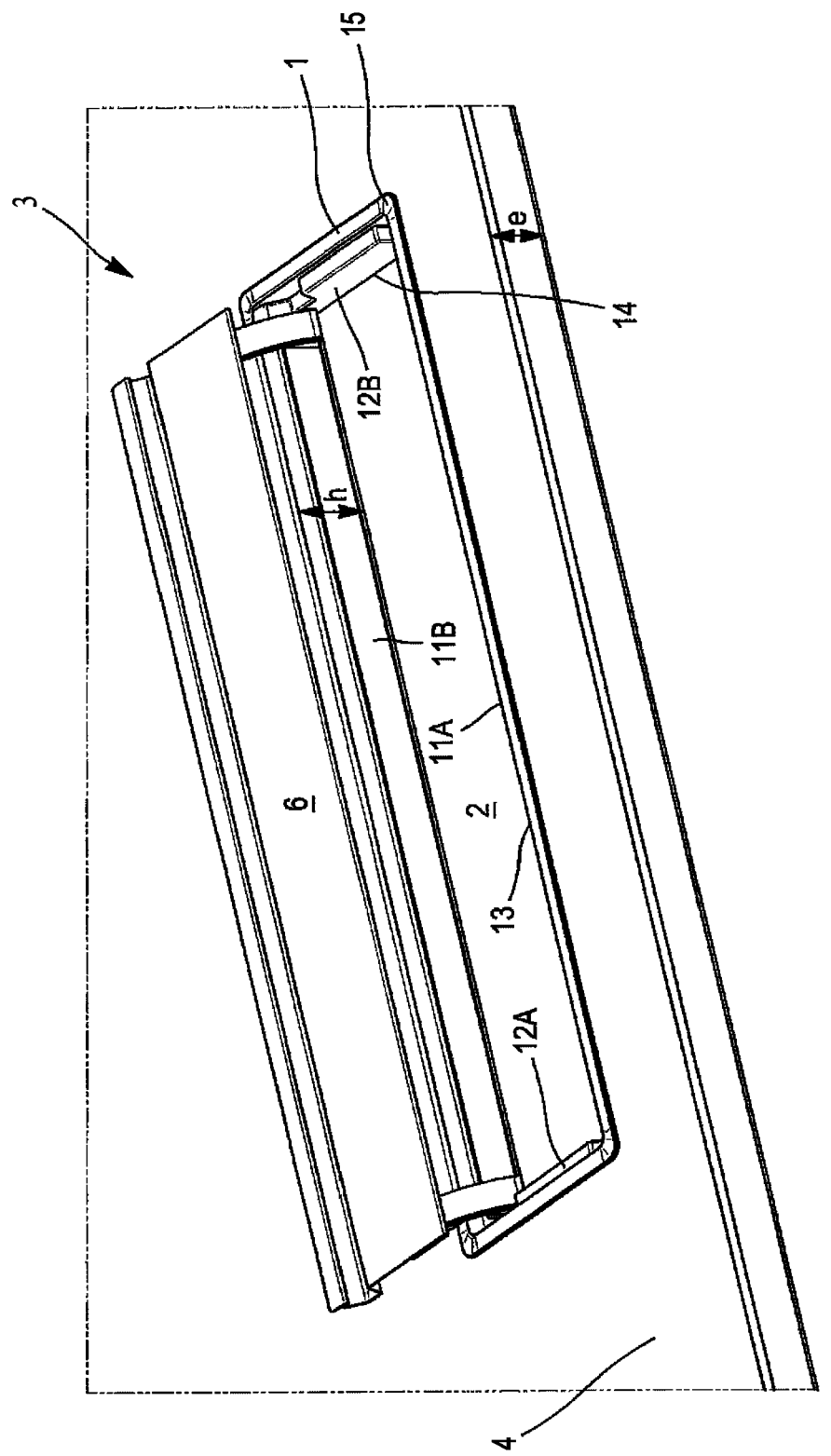
FIGS. 1A and 1B show a top view of a work surface comprising a through-hole covered with a frame supporting a flap in dosed and open position respectively.

With reference to the figures, the invention concerns a device for fastening a frame 1 in a through-hole 2 formed through the e thickness of a work surface 3, such as for example a desk top, and therefore extending between a first face and a second opposed face of the work surface 3, in this case between the upper face 3 and bottom face 4 of the latter.

In the example shown, the through-hole 2 has a parallelepiped shape, offering easy access to the space below the underside 5 of the workplan 3 from the top face 4. The frame 1 consists of a peripheral wall 10, closed on itself, manufactured from a material selected from the list comprising a plastic, a composite material, a metal, or any equivalent material.

The peripheral wall 1 has two longitudinal walls 11 parallel to each other, connected by two side walls 12 defining between them a shaped passage and of substantially identical dimensions to those of the through-hole 2. Thus, when the frame 1 is fitted into the through-hole 2, the peripheral wall 10 is able to coat the cutout in the work surface 3 to get the through-hole 2 and therefore the structure 9 of the work plan 3 delimiting said through-hole 2.

Also the peripheral wall 10 has an upper edge 13 extended by a ledge 15 adapted to rest on the upper face 4 of the workplan 3, around the through-hole 2.

The peripheral wall 10 has a height h substantially equal to the thickness e of the workplan 3, so that its lower edge 14 lies substantially flush with the bottom face 5 of said work surface 3 when the frame 1 is fitted into the through-hole 2. Of course, the peripheral wall may have a height h different, notably higher than the thickness e of the workplan without jeopardizing the spirit of the invention.

Figure 1B:
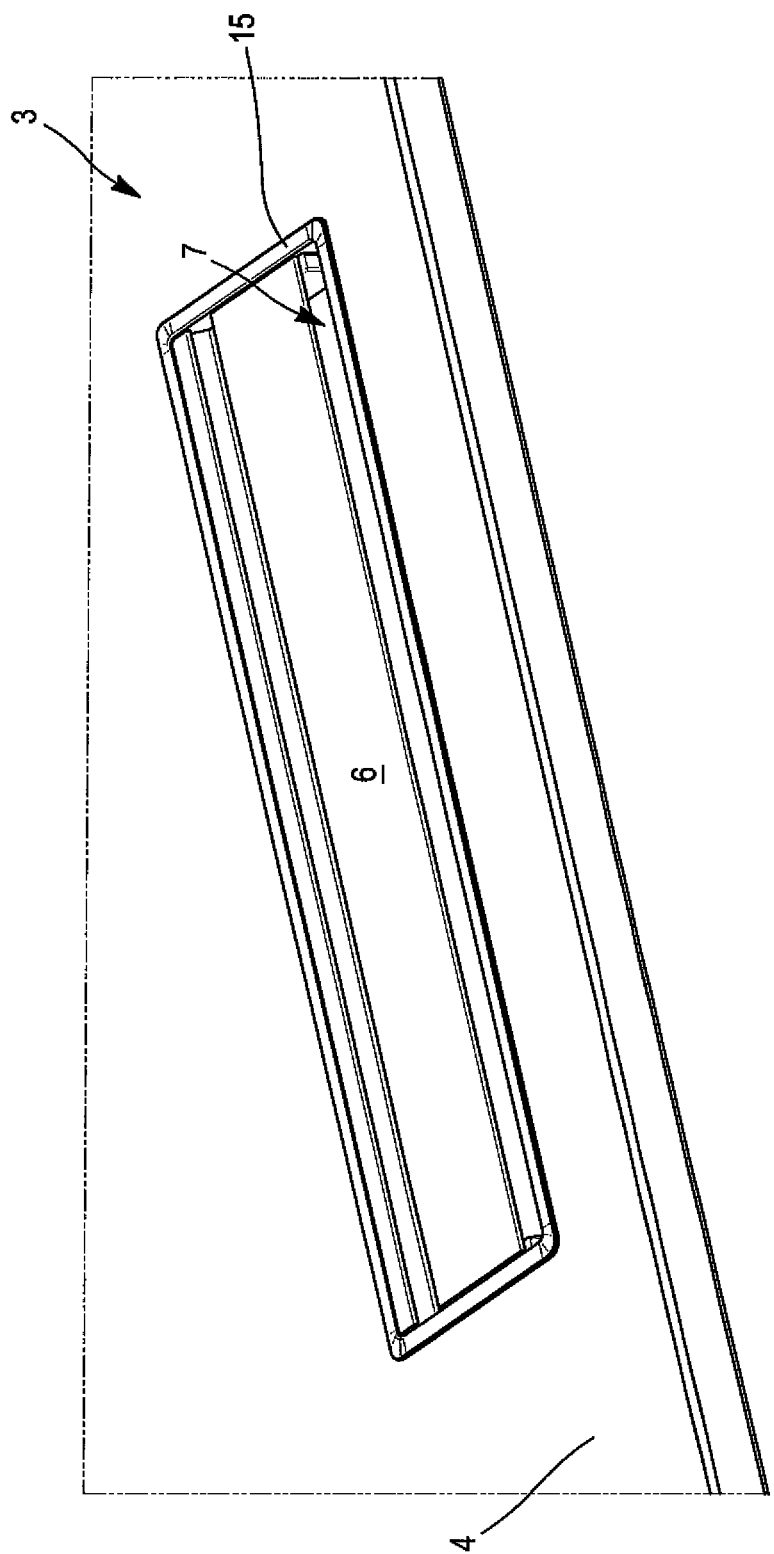
Figure 2:
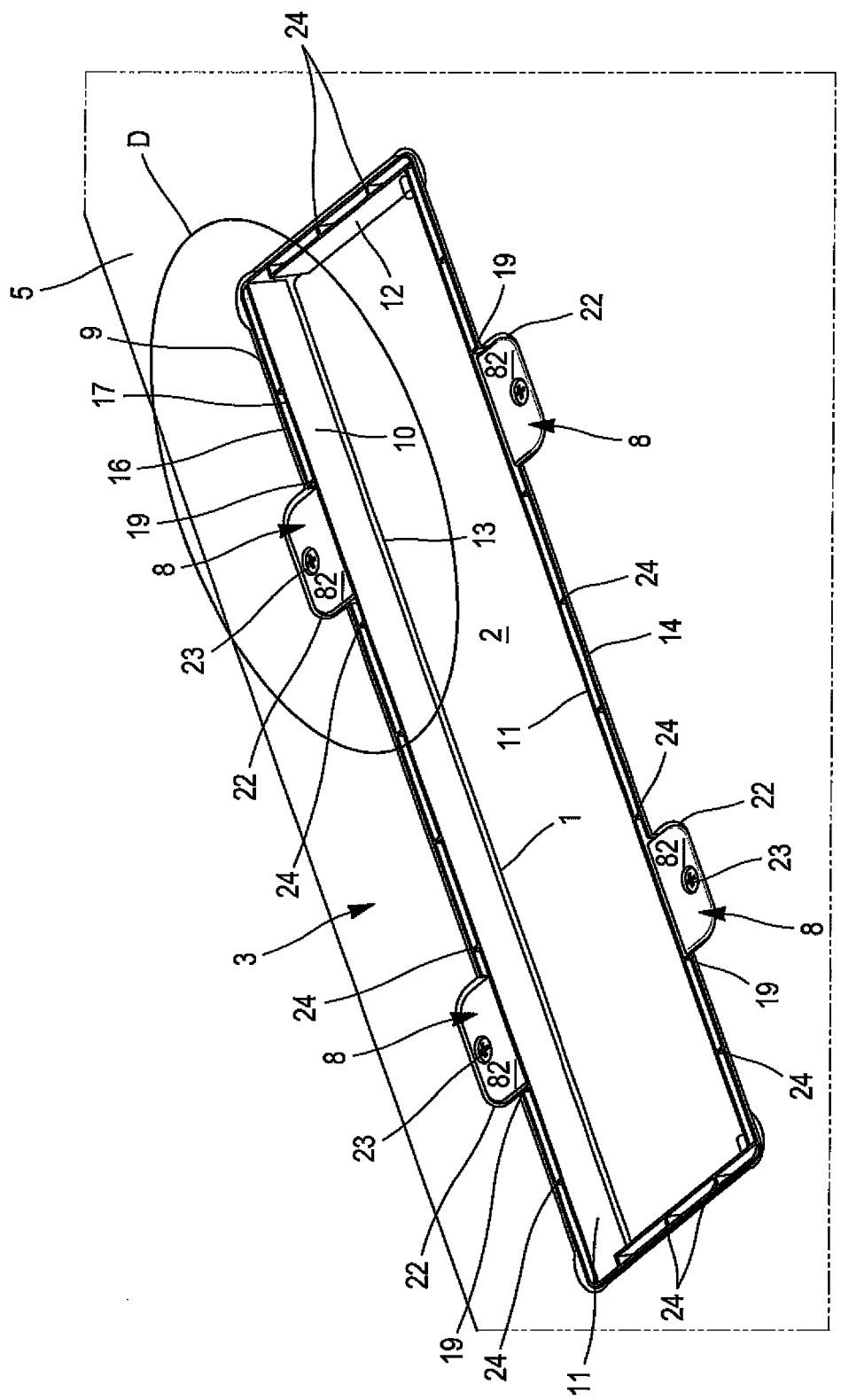
FIG. 2 shows a bottom view of the work surface of FIG. 1.

As shown in FIGS. 1 and 2, the frame 1 serves also as support to a hatch 6 also pivotally mounted on the side walls 12 of the peripheral wall 10, and which can adopt an open position (FIG. 1) providing access to the space under the work surface 3 or a closed position (FIG. 2) in which it is substantially located in the plane of the upper face 4 of the worktop 3. Conventionally, the dimensions of the flap 6 are preferably such that in its closed position a gap 7 for the possible cables passage is formed between the peripheral wall 10 of the frame 1 and the hatch 6.

In the illustrated embodiment, the frame 1 is advantageously fixed on the work surface 3 by means of four identical clamping elements 8, manufactured, like the frame 1, in a material selected from the list comprising a plastic, a composite material, a metal, or any equivalent material. The clamping elements 8 are distributed in pairs along the longitudinal walls 11 of the frame 1, provided that the number of clamps 8 and distribution are merely exemplary and can be adapted on a case by case basis, depending on the shape and dimensions of the frame 1.

Each clamping element 8 has a portion capable of engaging with the frame 1 and another portion arranged to be attached the work plan 3. In the alternative embodiment shown, each clamping element 8 includes for this purpose two arms 80, 81 extending the edge 85 of a tab 82, here substantially shaped like a half-moon, and which extends in a plane perpendicular to said arms 80, 81 (FIGS. 5 and 6). According to the invention, arms 80, 81 are arranged to cooperate with said frame 1, while the tab 82 is intended to be fixed against the work surface 3, in this case against the underside 5 of the latter, through a suitable connecting means.

In the illustrated alternative embodiment the two arms 80, 81 of a clamping element 8 are symmetrical with respect to an axis X centered on the edge 85 of the tab 82. In addition, they each have an area 83 substantially rectilinear, and a hook-shaped area 84. In fact, the arms 80, 81 are intended to be engaged in a housing 18 of the frame 1 (FIGS. 5 and 6) having an abutment on which the hook 84 of an arm 81 is adapted to bear so as to exert on the frame 1 a force to flatten the rim 15 against the top side 4 of the workplan 3, when the tab 82 is attached to the underside 5 of the workplan 3.

In the alternative embodiment shown, the frame 1 thus comprises four housings 18, distributed in pairs along each of the longitudinal walls 11 of the peripheral wall 10. Advantageously, the latter may be defined by a double wall having an outer wall 16 and an inner wall 17 forming between them a space allowing the introduction of the arms 80, 81. According to the invention, each housing 18 is delimited by said space between the outer wall 16 and inner wall 17 of the peripheral wall 10, and by a cutout 20, of substantially parallelepiped shape formed on the outer wall 16, near the lower edge 14 of the peripheral wall 10.

In fact, the cutout 20 has a substantially identical height to the thickness of the tab 82 and a length substantially identical to the length of the edge 83 of the tab 82. The cutout 20 is made on the outer wall 16 at a location, when the frame 1 is fitted into the through-hole 2, opposite a recess 22 that the underside 5 of the worktop 3 may preferably comprise, and whose shape is complementary to that of the tab 82.

Thus, when both arms 80, 81 of a clamping element are engaged in a housing 18, the tab 82 and its edge 85 are adapted to rest respectively in a recess 22 and above the cutout 20 defining said housing 18. With such a configuration, the tab 82 of the clamping element 8 is considered as it were integrated into the bottom face 5 of the working plane 3, which improves the quality of the assembly between the frame 1 and the worktop 3 while preventing the presence of any protruding elements on the lower face 5 of the worktop 3.

Preferably, the spacing between the outer wall 16 and internal wall 17 of the peripheral wall 10 of the frame 1 substantially corresponds to the thickness of the arms 80, 81 of a clamping element 8 so that they can be engaged with a tight fit and exert on the outer wall 16 a force to flatten the peripheral wall 10 against the structure 9 of the worktop 3 around the through-hole 2, once the tab 82 is attached to the underside 5 of the worktop 3.

Furthermore, in the illustrated embodiment, the abutment comprises a housing 18 that is defined by a ridge 19 formed between the external walls 16 and 17 of the peripheral wall 10 of the frame 1, at one side end of the cutout 20. Referring to FIGS. 5 and 6, the ridge 19 extends from said lower edge 14 of the peripheral wall 10, perpendicular to said lower edge 14, over a height corresponding substantially to the length of the straight area of an arm 80, 81 of a clamping element 8. actually, the ridge 19 is so designed that the hook-shaped area 84 of one of the arms 80, 81, namely the arm 81 in the example shown, is supported on the free end 21 of the ridge 19 when the two arms 80, 81 are engaged in a housing 18 and the tab 82 rests in a recess 22 of the lower face 5 of the worktop 3.

In fact, to secure the frame 1 in the through-hole 2 in which it has previously been fitted such that its ledge 15 rests on the upper face 4 of the worktop 3, are used successively each of the four clamping elements 8 all being manipulated in a similar manner.

FIGS. 3 to 7 show the various stages of implementation of a clamping element 8 for fixing the frame 1 in the through-hole 2.

Thus, as shown in FIG. 3, the first step is to introduce, in a first housing 18, one of the two arms 80, 81 of a clamping element 8, the hook-shaped zone 84 is assumed to interact with the ridge 19. In the illustrated example, it is the arm 81.

We then rotate the hook-shaped zone 84 of the latter around the free end 21 of the ridge 19 (FIGS. 4 to 6) until the second arm 80 is fully engaged in the housing 18 and the tab 82 lies in the recess 22 of the lower face 5 of the worktop 3.

An assembly means, such as for example a screw 23 or any other equivalent means such as notably a tail clip, or a rivet, is then used to attach the tab 82, including in this example a hole 26 in the recess 22.

Tightening the tab 82 against the underside 5 of the worktop 3 has the effect of maintaining the clamping element 8 in an active position in which the two arms 80, 81 are engaged in the housing 18, and lie both against the face of the outer wall 16 of the peripheral wall 10 which is thus pressed against the structure 9 of the worktop 3 defining the through-hole 2. Naturally, this action will have all the more impact since the width of the arms 80, 81 and therefore the contact surface between the latter and the outer wall 16, will be important.

In the active position of the clamping element 8, the hook-shaped zone 84 of the arm 81 also exerts on the ridge 19 a force making it possible to flatten the rim 15 of the frame 1 against the top side 4 of the worktop 3.

These two concurrent actions conveniently make it possible to prevent any play between the frame 1 and the structure 9 of the worktop 3 around the through-hole 2.

Thus, in its active position, a clamping member 8 allows both to maintain the frame structure 1 in the through-hole 2, so as to prevent accidental dislocation, and the aesthetic appearance of the assembly since 1 allows the frame to perfectly fit the cutout in the worktop 3 and thus present a flawless finish.

A series of regularly spaced connecting ridges 24 connecting the outer wall 16 and inner wall internal 17 and extending preferably over the entire height of the peripheral wall 10 between its upper edge 13 and lower edge 14 further allow the stiffening of the frame 1 and further improve the mechanical strength and therefore the aesthetics.

According to another characteristic of the invention, the tab 82 also includes stiffening means, avoiding inadvertent deformation of the tab 82, such as for example one or more ridges 25 traversing its underside.

As is dear from the above, the present invention thus achieves the objectives set out in the introductory part of this description.

Also the embodiment is advantageous from the point of view of implementation. In that a clamping member 8 comprises two symmetrical arms 80, 81 permits its use irrespective of the configuration of the housing 18 and the position of the ridge 19 at one or other of the lateral ends of the cutout 20. Nevertheless, it is quite conceivable to provide a clamp with only one arm, such a configuration may, where appropriate, involve the use of a greater number of clamps and be more appropriate in certain cases, notably where the through-hole is small.

Of course, the present invention is not limited from the viewpoint of the shape and dimensions of the orifice through 2 and therefore the frame 1, which could also present an infinite variety of other shapes, chosen according to functional and/or aesthetic criteria and be joined by means of one or more clamping elements 8 as described above.

Thus, the configurations shown in the figures are only possible examples, in no way limiting, of the invention which encompasses on the contrary variations in shape and design to the scope of the skilled artisan.

The invention claimed is:

1. A device for fixing a frame in a through-hole extending between two opposite faces of a panel, the frame including a peripheral wall having an upper edge and a lower edge and configured to cover a structure of the panel delimiting the through-hole, the upper edge of the peripheral wall including an edge configured to rest against a first face of the panel around the through-hole, the device comprising:
   at least one clamping element comprising at least one arm including a substantially hooked-shaped section integral with a tab extending in a plane perpendicular to the at least one arm and an assembly structure for securing the tab on the second face of the panel in the vicinity of the through-hole, the at least one arm of the clamping element configured to exert a force on the peripheral wall adapted to flatten the peripheral wall against the structure of the panel defining the through-hole and to exert a force on a stop of the peripheral wall adapted to flatten a ledge of the frame against the first face of the panel when the tab is fixed on the second face of the panel.

2. The device according to claim 1, wherein the peripheral wall of the frame includes a double wall having an outer wall and an inner wall, the outer wall having at least one cutout extending from the lower edge towards the upper edge of the peripheral wall over a length substantially corresponding to the width of the tab of the clamping element and a height substantially corresponding to the thickness of the tab, the cutout and the space between the outer wall and the inner wall adjacent to the cutout defining a housing for the arm of the clamping element.

3. The device according to claims 1, wherein the arm includes a substantially rectilinear portion extended by the substantially hook-shaped section.

4. The device according to claim 3, wherein an abutment is defined by a ridge extending along the cutout between the outer wall and the inner wall of the peripheral wall, from the lower edge towards the upper edge of the peripheral wall, the length of the ridge corresponding substantially to the length of the substantially straight section of the at least one arm of the clamping element.

5. The device according to claim 2, wherein the distance between the inner wall and the outer wall of the frame is configured to allow a tight fit of the at least one arm of the clamping element engaged in the housing.

6. The device according to claim 2, wherein the double wall is reinforced by a series of ridges interconnecting the outer wall and the inner wall and extending between the top edges and bottom edges of the peripheral wall.

7. The device according to claim 6, wherein the ridges of the double wall are substantially equidistant.

8. The device according to claim 1, wherein the at least one arm includes two arms extending in a same plane perpendicular to the tab and symmetrical with respect to an axis centered on a side of the tab to which the arms are secured, and wherein each of the two arms includes a substantially hook-shaped section that extends outward.

9. The device according to claim 2, wherein the second face of the panel comprises a recess of complementary shape to the tab of the clamping element wherein the tab can rest when the at least one arm is engaged in the housing and bearing on the abutment.

10. The device according to claim 1, wherein the assembly structure for securing the tab against the second face of the panel comprises at least one of a screw, a tail clip, and a rivet.

11. The device according to claim 10, wherein the tab includes at least one hole allowing the passage of the assembly structure.

12. The device according to claim 1, wherein the tab comprises stiffening structure.

13. The device according to claim 12, wherein the underside of the tab is traversed by at least one edge.

14. A method of implementation of a device according to claim 1 for fixing the frame in the through-hole extending between the two opposite faces of the panel, comprising:
inserting the device in the through-hole of the frame;
placing the edge of the frame against the first face of the panel around the through-hole;
positioning the at least one arm secured to the tab of the clamping element in contact with the peripheral wall of the frame and the abutment of the peripheral wall; and
swiveling the at least one arm around the abutment of the peripheral wall so as to bring the tab of the clamping element in contact with the second face of the panel.

15. The method according to claim 14, wherein, to move the at least one arm of the clamping element in contact with the peripheral wall of the frame and the ridge the peripheral wall includes, the at least one arm is engaged in a housing formed between an outer wall and an inner wall of the peripheral wall of the frame.

16. The method according to claim 14, wherein when the tab of the clamping element is brought in contact with the second face of the panel, the tab is positioned a recess of complementary shape positioned in the second face of the panel.

17. The method according to claim 14, wherein the tab of the clamping element is secured on the second face of the panel by at least one of a screw, a tail clip and a rivet.

18. A device for fixing a frame in a through-hole extending between two opposite faces of a panel, the frame including a peripheral wall having an upper edge and a lower edge and configured to cover a structure of the panel delimiting the through-hole, the upper edge of the peripheral wall including an edge configured to rest against a first face of the panel around the through-hole, the device comprising:
at least one clamping element comprising at least one arm integral with a tab extending in a plane perpendicular to the at least one arm and an assembly structure for securing the tab on the second face of the panel in the vicinity of the through-hole, the at least one arm of the clamping element configured to exert a force on the peripheral wall adapted to flatten the peripheral wall against the structure of the panel defining the through-hole, to swivel around a stop of the peripheral wall so as to bring the tab of the clamping element towards the second face of the panel, and to exert a force on the stop of the peripheral wall adapted to flatten a ledge of the frame against the first face of the panel when the tab is fixed on the second face of the panel.

* * * * *